United States Patent [19]

Frykhult

[11] Patent Number: 4,678,575
[45] Date of Patent: Jul. 7, 1987

[54] ROTATABLE FILTER DISC ASSEMBLY

[75] Inventor: Rune H. Frykhult, Huddinge, Sweden

[73] Assignee: AB Celleco, Sweden

[21] Appl. No.: 755,784

[22] Filed: Jul. 17, 1985

Related U.S. Application Data

[63] Continuation-in-part of Ser. No. 523,590, Aug. 16, 1983, abandoned.

[30] Foreign Application Priority Data

| Aug. 20, 1982 | [SE] | Sweden | 8204770 |
| Feb. 10, 1983 | [SE] | Sweden | 8300708 |
| Feb. 28, 1983 | [SE] | Sweden | 8301082 |

[51] Int. Cl.$^4$ .......................................... B01D 33/26
[52] U.S. Cl. ................................. 210/327; 210/331; 210/345; 210/346
[58] Field of Search ............... 210/331, 345, 404, 406, 210/347, 346, 486, 327

[56] References Cited

U.S. PATENT DOCUMENTS

| 1,538,980 | 5/1925 | Genter | 210/345 |
| 2,255,205 | 9/1941 | Chamouton | 210/486 |
| 3,193,105 | 7/1965 | Putnam | 210/331 |
| 4,056,473 | 11/1977 | Nilsson | 210/345 |
| 4,136,028 | 1/1979 | Toivonen | 210/331 |
| 4,152,267 | 5/1979 | Davis et al. | 210/331 |
| 4,157,301 | 6/1979 | Wegener | 210/404 |
| 4,169,794 | 10/1979 | Badino | 210/347 |
| 4,180,461 | 12/1979 | Langvik | 210/345 |
| 4,216,093 | 8/1980 | Kane et al. | 210/345 |

FOREIGN PATENT DOCUMENTS

| 2506527 | 8/1976 | Fed. Rep. of Germany . |
| 7406315 | 9/1976 | Sweden . |
| 1009952 | 11/1965 | United Kingdom . |
| 2072034 | 9/1981 | United Kingdom . |
| 564872 | 7/1977 | U.S.S.R. . |

OTHER PUBLICATIONS

AGP Vargo, "Disc Filter/Thickener" brochure, AG Produksjon A-S, Valerxeien 165, Post Box 173, N-1501 Moss, Norway.
Celleco, "Centerdisc Multi-Disc Filter" brochure, Celleco, Inc., 5305 Oakbrook Parkway, Norcross, Ga. 30093.
Hedemora, "Disc Filters" brochure, AB Hedemora Verkstader, S-77600 Hedemora Sweden.
Hedemora, "Drum Filters" brochure, AB Hedemora Verkstader, S-77600 Hedemora Sweden.

Primary Examiner—Richard V. Fisher
Assistant Examiner—Linda S. Evans
Attorney, Agent, or Firm—Davis Hoxie Faithfull & Hapgood

[57] ABSTRACT

A rotatable filter assembly, primarily intended for separation of fibers from a fiber suspension, comprises a number of annular filter discs (3) formed by a plurality of filter elements (5). The filter discs are mounted on a horizontal drum rotatable in a container (1) and formed by axial discharge tubes (6) and transverse tubes (7) which communicate with the individual filter elements (5). A collecting hopper (8) extends into the drum through an open end of it. During at least part of the rotation of the drum, the interior of each filter element (5) is kept at a pressure lower than that prevailing at the outside of it. The filter assembly is characterized in that the axial discharge tubes (6), as seen in a cross-sectional view, are arranged in groups each comprising at least two tubes.

15 Claims, 18 Drawing Figures

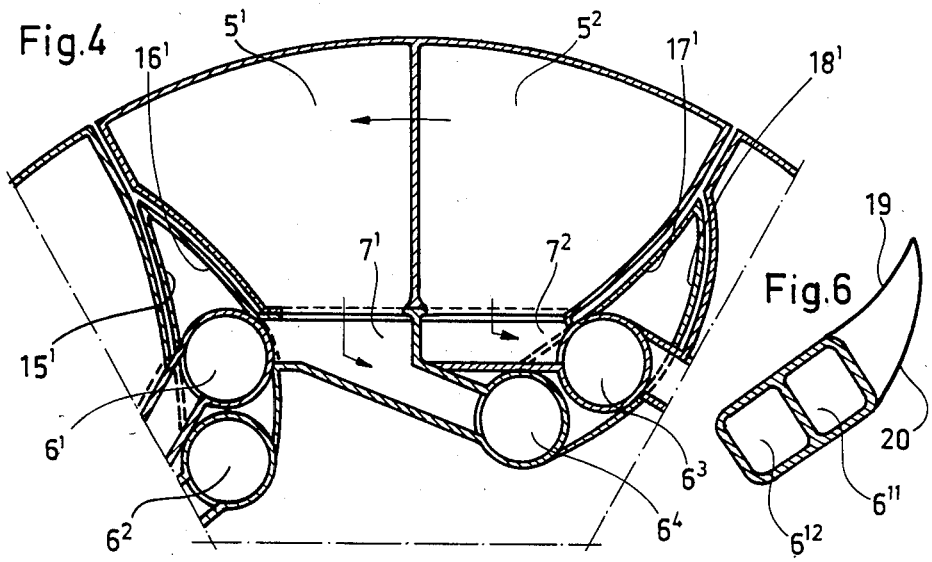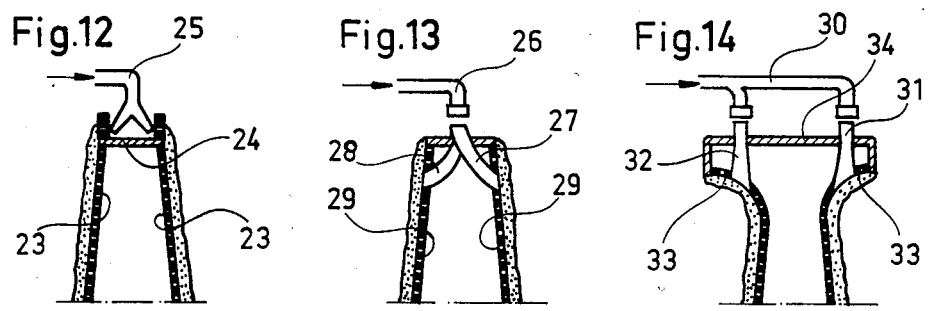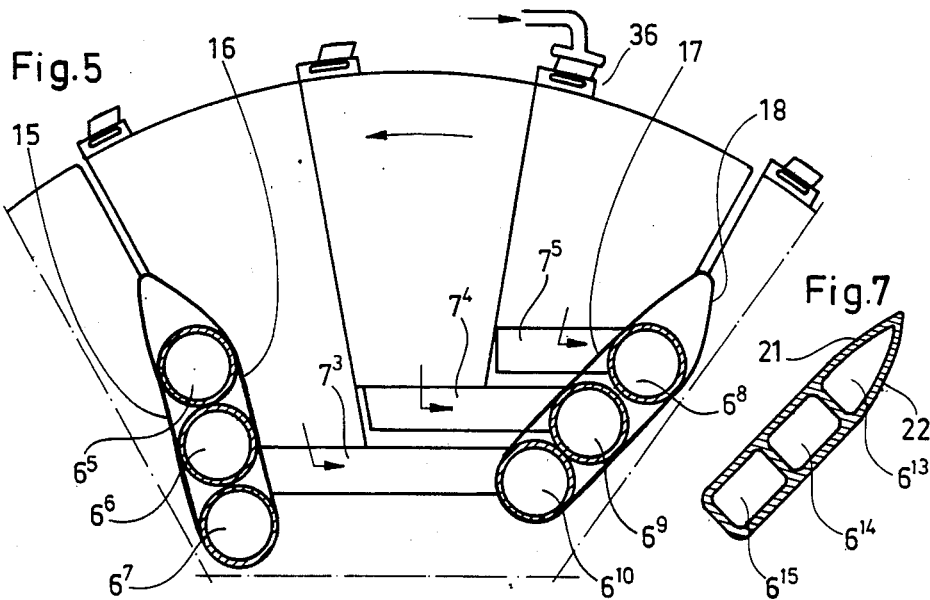

ROTATABLE FILTER DISC ASSEMBLY

This is a continuation-in-part of my copending application, Ser. No. 523,590 filed Aug. 16, 1983, now abandoned.

This invention relates to a rotatable filter assembly primarily intended for separation of fibers from a fiber suspension and which comprises a plurality of annular filter discs formed by filter elements. The filter discs are mounted in axially spaced, substantially parallel relation on a horizontal drum rotatable in bearings and driven in a container for the fiber suspension to be separated. Each filter element is a hollow body with walls of filter cloth and communicates via a filtrate outlet provided at its radially inner end with an axial discharge tube in the drum. The drum is formed as a cylinder with a mantle wall containing discharge tubes extending axially and communicating with the filter elements. A collecting hopper for the filter cake extends into the drum through an open end of the drum and has its opening facing upwards along all filter discs carried by the drum. The interior of each filter element is separately kept at a pressure lower than that prevailing outside, during at least part of the rotation of said drum.

Filter assemblies of this type are described in Swedish Patent Specification No. 7406315-7 and in the U.S. Pat. No. 4,056,473 to Nilsson. By putting the collecting hopper for the filter cake in the drum, an advantage was obtained in that the filter surface was better utilized because the liquid level in the filter container could be raised compared with what had previously been possible. With the collecting hopper placed within the drum instead of between the filter discs, the latter run freely, without wear, which means that their life is increased. Furthermore, the distance between the filter discs can be reduced and the space needed for a filter disc of a certain capacity thus was reduced appreciably.

Despite these advantages, however, rotatable disc filter assemblies of the Nilsson type have some drawbacks. A relatively large filter area is still needed for a given separation capacity. Moreover, the axial discharge tubes in the drum have had to be designed with a substantially rectangular cross-section, with the longitudinal axis of symmetry coinciding with radii of the rotatable drum, so that openings towards the central space of the rotatable drum are large enough for passage of separated fiber filter cake to the collecting hopper. This design of the discharge tubes, which are subject to varying load, means that the wall thickness must be relatively large, with resulting heavy weight. Furthermore, the manufacture of such tubes is very expensive.

A further difficulty which has arisen with these prior devices is that the filter cake, in falling toward the collecting hopper after removal from the surface of the filter elements, tends to land on the axial discharge tubes, building up on these tubes and leading to a further and increasing obstruction of the passage to the collection hopper. This tendency can be lessened by maintaining the degree of vacuum applied to the filter elements at a very low level, typically about 1 psi, so that the filter cake retains a higher moisture content and disintegrates more easily. However a low vacuum makes the device less efficient because it means that the speed of rotation must be kept very low (e.g., 0.8 r.p.m.) to give the cake time to build up. It is also the case that at higher rotational speeds there is a greater tendency for the trailing discharge pipe i.e. the discharge pipe at the trailing end of the passage, to intercept filter cake falling from the filter surfaces toward the collecting hopper.

The present invention is an improvement over the rotary Nilsson filters described above. The principal object of the present invention is to provide a rotatable filter assembly of the disc type previously mentioned which has a substantially increased capacity per unit filter area, better operational safety, increased dry content of the separated fiber mass (filter cake), less weight and lower manufacturing costs.

Such a disc filter assembly is characterized, according to the invention, in that the axial discharge tubes which remove filtrate from the filter elements, as seen in a cross-sectional view, are arranged in groups each comprising at least two tubes. The immediate effect of this change in design is to increase the size of the passageway through which filter cake detached from the outer surfaces of the filter elements falls into the collecting hopper to avoid piling up of the filter cake on the tubes. However the indirect consequences of the design are to enable the use of a higher level of vacuum, e.g. −6 psig, in the interior of the filter elements, and a substantially higher speed of revolution, up to say 3 r.p.m., resulting in a more complete dewatering of the filter cake and up to 100% increase in capacity.

Moreover, the disc filter assembly according to the invention can be built substantially more cheaply, because standard tubes having a circular cross section can be used. In this way the weight of the disc filter assembly can also be made substantially lower than in prior constructions.

The invention is, of course, also applicable with tubes of cross-sections other than circular, such as those having square cross-sections. These tubes may be built together as a unit, permitting a still larger opening between the groups of axial discharge tubes.

The tubes can also be built together with a common dividing wall and having cross-sectional forms other than round or square. This is especially useful where all the tuubes in a group, as seen in a cross-sectional view, are arranged at substantially the same distance from the center of said drum.

In one embodiment of the disc filter assembly according to the invention, a filter element communicates with an axial tube which, as seen in the direction of rotation, is arranged after, or in the rear of, this filter element, while the succeeding filter element communicates with another axial tube arranged in a group with the first mentioned tube.

The tubes of the new disc filter assembly, as seen in a cross-sectional view may be located on or near the same radius of the drum but at different radial distances to the center of the drum.

In a particularly useful variation of this last embodiment the tubes of each group which are closer to the center of the rotatable drum are circumferentially displaced in the rotation direction with respect to tubes at a greater distance from said center. This embodiment enhances still further the passage of the separated fibers from the filter elements to the collecting hopper. In order to further facilitate this passage, guide plates may be positioned, as seen in the rotational direction of the drum, in front of and back of the axial tubes. The tubes may be built as a unit with the guide plates.

The said guide plates may extend radially above the axial tubes, preferably so that they cover at least part of the radial extension of the filter elements.

The removal of filter cake from the surface of the filter elements can be facilitated in different ways, depending on the type of fiber present. Conventionally, the fibrous filter cake has been removed by spraying water or pressurized air against the edge of the cake in a so-called removal zone, that is, a zone above the collecting hopper where no vacuum is maintained on the inner side of the filter cake. There are, however, easily dewatered fiber suspensions which form thick pulp cakes on the filter elements. These pulp cakes can be difficult to remove. According to one embodiment of the new filter assembly, there is provided, in the removal zone, an overpressure on a certain part of the inner side of the dewatered fiber cake, whereby removal of the fiber cake is started and is then completed by gravitational force. To further facilitate the removal, the filter elements can be inclined outwards, at least along part of the circumference as seen in longitudinal sectional view. Connecting pipes can be arranged at the circumference of the filter elements, opening in the filter surface under the fiber cake, and connectable to a supply of liquid or gas under pressure. The openings of the connecting pipes should be narrow and elongated so that the fiber cake can build bridges over them.

It is especially desirable to arrange the connecting pipes so that during a certain part of the revolution of the rotatable drum (namely, in the removal zone) they communicate with a stationary nozzle for feed of gas or liquid under pressure. By the aid of said devices for removal of fiber cake, the need for feeding liquid is reduced, and the dry solid content of the separated fiber mass increased. If gas under pressure is used (usually pressurized air) the need for gas flow is reduced and the cost is reduced.

The invention will now be described more in detail, reference being made to the accompanying drawings in which:

FIG. 4 is a sectional view on line IV—IV in FIG. 1, that is part of FIG. 3 on an enlarged scale;

FIG. 5 shows another embodiment of the same apparatus part in a view similar to FIG. 4;

FIGS. 6 and 7 show alternative embodiments of discharge tubes with guide plates in a cross-sectional view;

FIGS. 12, 13 and 14 show different embodiments of devices for removal of filter cake, in a cross-sectional view;

Figure 1:
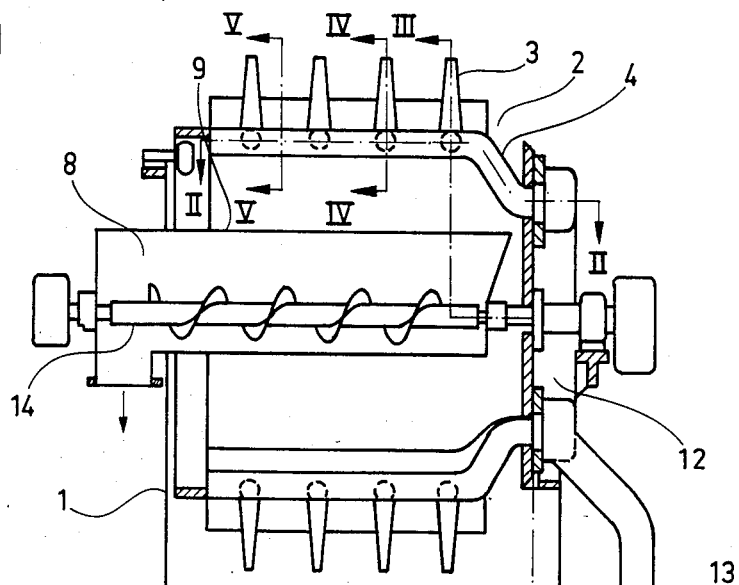
FIG. 1 shows a rotatable filter assembly according to the invention, in a longitudinal sectional view on line I—I in FIG. 3.

In FIG. 1, a container 1 for fiber suspension holds a horizontal filter rotor 2 partly submerged in the container. Rotor 2 is composed of a number of annular filter discs 3 which are mounted substantially parallel to each other on a horizontal drum 4 coupled to a driving motor. The filter discs 3 are composed of a number of separate filter elements 5 (FIG. 3) each of which is formed as a hollow body, with walls of filter cloth, communicating via a filtrate outlet at the radially inner end with an axial discharge tube 6. In FIG. 4 there is shown in more detail how a filter element $5^1$ is connected to an axial discharge tube $6^4$ via a perpendicular tube $7^1$, and a filter element $5^2$ is connected via a perpendicular tube $7^2$ to an axial tube $6^3$.

Figure 15:
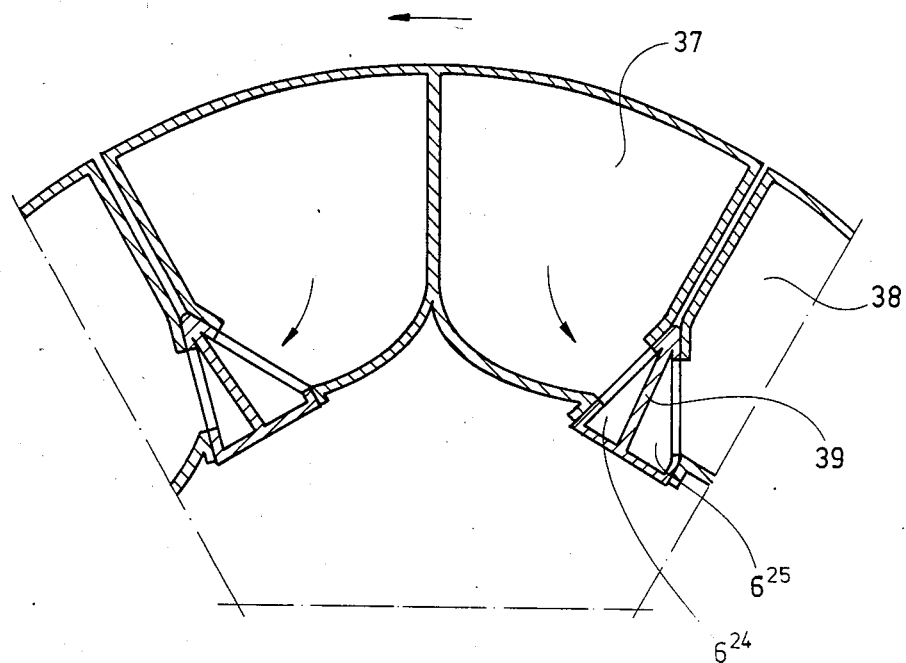
FIG. 15 shows in section a further embodiment of the same part of apparatus which is shown in FIG. 4.
Figure 17:
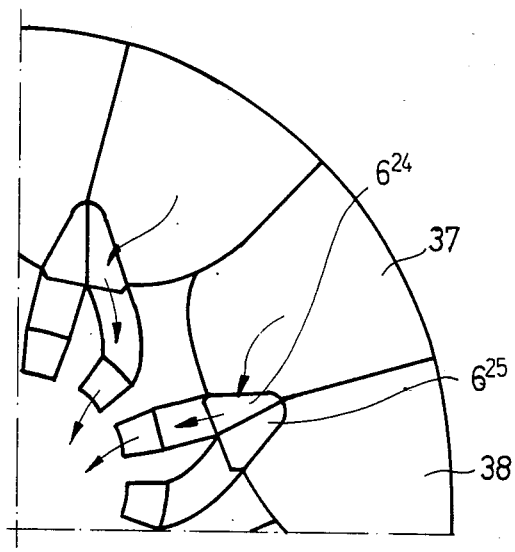
Figure 18:
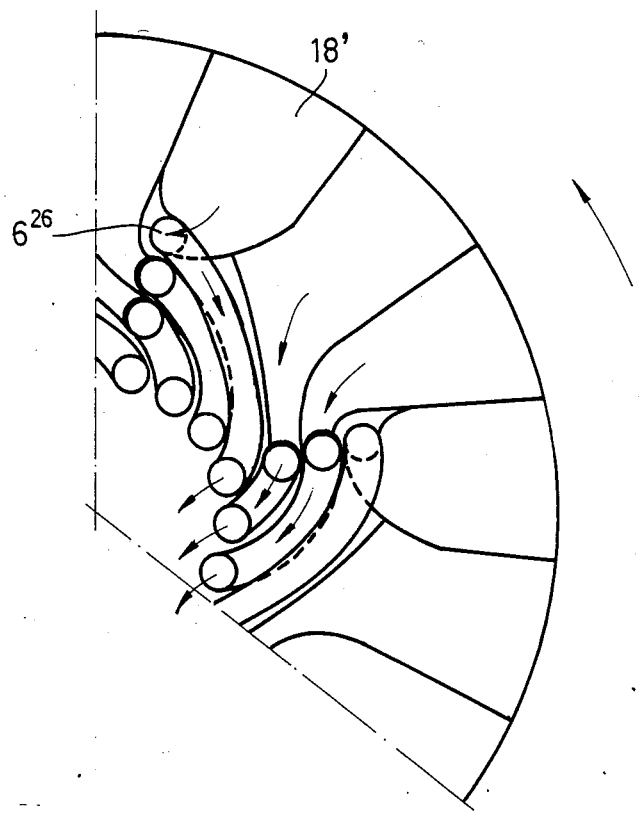

The drum 4 is thus built partly from axial discharge tubes 6 a grating-like mantle wall and partly from perpendicular tubes 7. These perpendicular tubes can be replaced by built-in tubes within the filter elements, as is shown in FIGS. 15, 17 and 18. The coupling to a driving motor is not shown in detail but is done according to well-known techniques.

A collecting hopper 8 extends into drum 4 through one open end thereof and has its upwardly facing opening 9 extending along all filter discs 3 carried by drum 4. The filter rotor 2 rotates in the direction indicated by an arrow 10 in FIG. 3. The level of the fiber suspension in container 1 is shown at 11. In order to operate a rotatable filter assembly of the present type optionally, it is mandatory that there be provided a vacuum or subpressure acting on the interior of each filter element 5 during part of the revolution and which is substantially less than the hydrostatic pressure acting on the outside of the filter element 5 below the level 11. This vacuum can be provided by a vacuum pump connected to a filtrate discharge pipe 13 (FIG. 1) or by designing discharge pipe 13 like a so-called "falling pipe".

When the rotating filter elements 5 reach the removal zone, the communication between the vacuum source 13 and the inner parts of the filter elements 5 is controlled by a valve or lock device 12, and the filter elements will then communicate with the atmosphere so that the vacuum is released and the filter cake can be removed. The parts 12–13 thus form means for subjecting the interior of each filter element 5 to a vacuum during part of the drum's revolution and releasing the vacuum when the filter element reaches a position above the hopper 8.

In the collecting hopper 8 is a transport screw 14 rotatable in bearings and serving to remove the fiber mass or filter cake from the collecting hopper 8.

Figure 8:
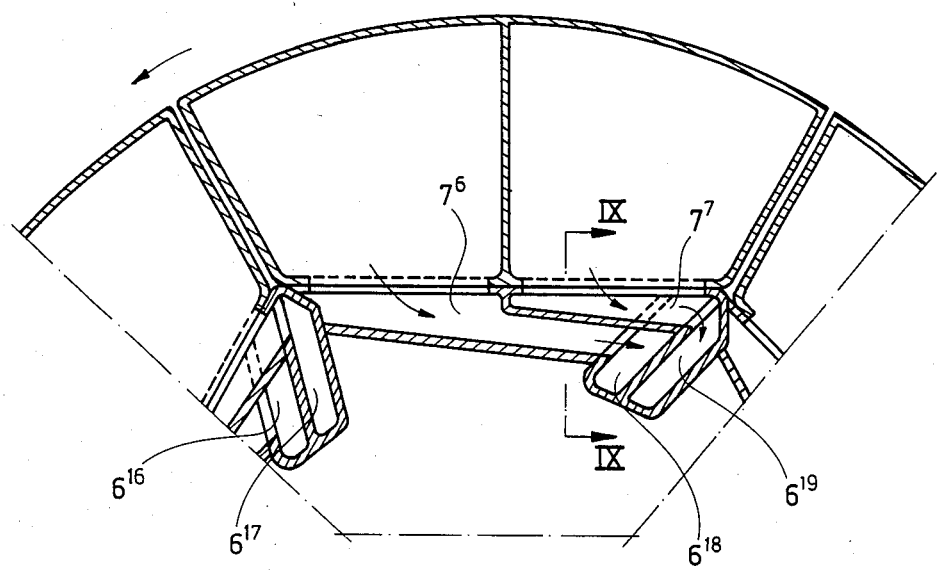
FIG. 8 shows in section a further embodiment of the same part of apparatus, which is shown in FIG. 4.
Figure 9:
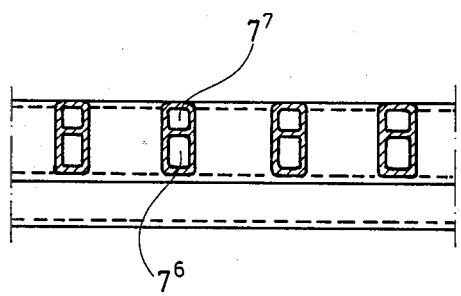
FIG. 9 is a sectional view on line IX—IX in FIG. 8.

As is especially obvious from FIGS. 4, 5 and 8, the axial discharge tubes 6 are arranged, as seen in a cross-sectional view, in groups of at least two tubes. In FIGS. 4 and 5, embodiments are shown where the axes of the tubes in each group are close to the same radius of the rotatable drum 4 but at different radial distances from this center. In FIG. 8, the tubes in each group are at substantially the same radial distance to said center.

The embodiments shown in FIGS. 4 and 5 are designed in such a way that tubes closer to the center of the rotatable drum 4 (for instance, $6^2$ and $6^4$) are circumferentially displaced in the rotation direction of the rotatable drum in relation to tubes at a greater distance from said center ($6^1$ and $6^3$ in FIG. 4). The tubes in FIGS. 4 and 5 are provided with a circular cross-section, while the ones in FIGS. 6 and 7 are rectangular.

In order to facilitate the transfer of the filter cake from the filter elements to hopper 8, the tubes $6^5$, $6^6$, $6^7$ and the tubes $6^8$, $6^9$, $6^{10}$ in FIG. 5 are provided with guide plates 15, 16 and 17, 18. Corresponding guide plates covering the tubes $6^1$, $6^2$ and $6^3$, $6^4$ in FIG. 4 are marked $15^1$, $16^1$ and $17^1$, $18^1$. Often it can be enough to arrange such guide plates exclusively on the front side of the tubes, as seen in the direction of rotation. If the tubes are rectangular (FIGS. 6 and 7), the tube walls form a major part of the guide plates, and only minor parts 19, 20 and 21, 22 must be added to achieve uninterrupted passage for the fiber mass, by extending the guide plates radially above the axial tubes. The guide plates 15, 16, 17, 18 in FIG. 5 extend radially so that they cover part of the radial extension of the filter elements 5, whereby a smooth passage for the fiber mass is guaranteed.

Figure 10:
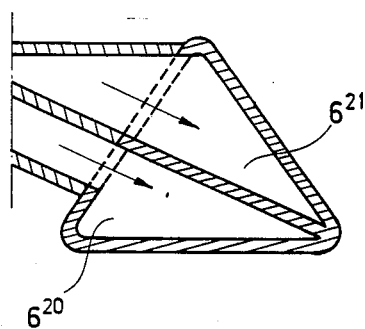
FIGS. 10 and 11 show alternative embodiments of discharge tubes with a common dividing wall in a cross-sectional view.
Figure 11:
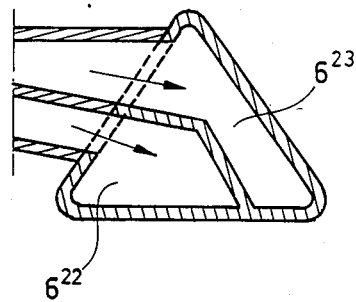

In FIG. 8, tubes $6^{16}$, $6^{17}$ and $6^{18}$, $6^{19}$ are substantially at the same radial distance from the center of the drum. They are built with a dividing wall in common. Other variations of the tubes are shown in FIGS. 10 and 11, and there too the tubes are at substantially the same radial distance from the center of the drum.

The embodiment in FIG. 15 differs from those previously described in that every other filter element 38 communicates with an axial tube $6^{25}$ located ahead of (before) the filter element as reckoned in the rotation direction of the drum. The other filter elements 37 communicate with axial tubes $6^{24}$ located behind the respective filter elements or in the rear of them. Both types of axial tubes are arranged in groups of two with a wall 39 separating the tubes of each group.

In order to achieve optimal function, the rear wall of each filter element is arranged so that when the filter element no longer communicates with the vacuum source but with the atmosphere, the rear wall is inclined towards the axial tube; that is, as seen in the direction of rotation, it is inclined towards a horizontal plane.

In FIG. 18 there is shown schematically a combination of the principal embodiment of FIG. 4, and the embodiment according to FIG. 15. As is apparent from the figure, each group of tubes contains three axial tubes, and each third filter element $18^1$ communicates with an axial tube $6^{26}$ which, as seen in the direction of rotation, is arranged before the filter element or in front of same. The other filter elements communicate with axial tubes which are arranged after the filter elements or to their rear. The three types of axial tubes are arranged in groups with three tubes in each group. The tubes are shown at different radial distances from the rotation center; but an embodiment with the tubes at the same radial distance from this center, and spaced from each other circumferentially, is also possible.

Figure 2:
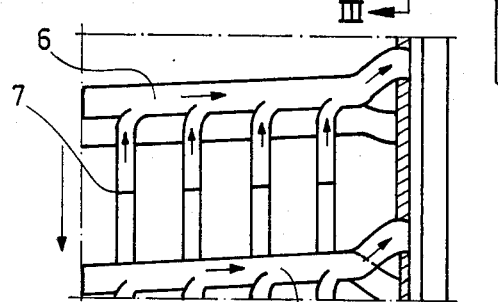
FIG. 2 is a development of a sectional view on line II—II in FIG. 1.
Figure 3:
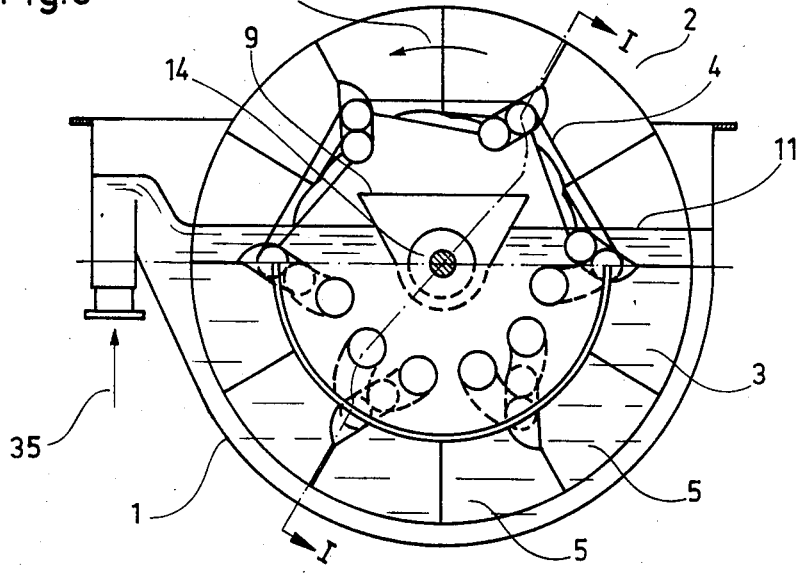
FIG. 3 is a sectional view on line III—III in FIG. 1.
Figure 16:
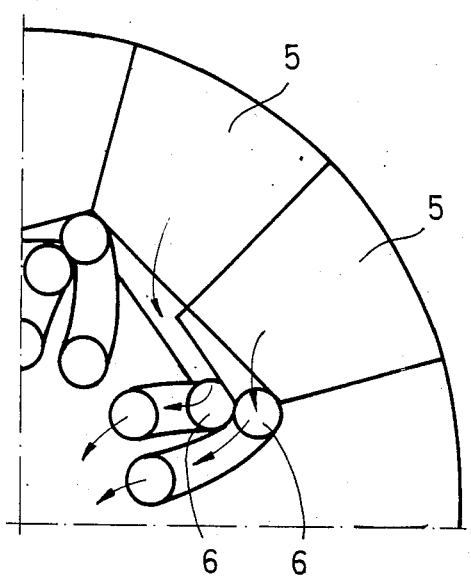
FIGS. 16, 17 and 18 show, partly in cross-section and partly schematically, parts of the apparatus comprising filter elements, axial tubes and outlets for filtrate.

In FIG. 16 there is shown schematically the path of the filtrate from a filter element 5, via an axial tube 6 to the outlet for filtrate, to a lock device (not shown) or to another device for filtrate discharge, according to FIGS. 1 to 3.

In FIG. 17 the path of the filtrate is illustrated schematically for a design according to FIG. 15.

In FIG. 18 the path of the filtrate is shown in an embodiment which is a combination of embodiments according to FIGS. 16 and 17.

It is evident from FIG. 3 and FIG. 16 that the exit openings from each of the axial tubes 6 into the locking device at the end of the drum are equally spaced around the drum. It follows that the angle between a radius drawn from the center of the outlet to the axis of the drum and a radius drawn from the center of the corresponding filter element to the axis of the drum is the same for all filter elements and outlets.

In the embodiment according to FIGS. 15 and 17, on the other hand, the filter elements should be designed with a sloping, trailing bottom wall in order that no pocket is formed which cannot be emptied. This is especially true in the position where the communication with the vacuum source has been disrupted.

Some easily dewatered fiber suspensions give rise to very thick pulp cakes which can be removed from the filter element only with difficulty. In FIGS. 12, 13 and 14 devices are shown, at the circumference of the filter element 5, which facilitate the removal of fiber mass from the filter surface. In FIG. 12 an embodiment is shown where the walls 23 of the filter element 5 are joined by a transverse wall 24, the walls 23 extending somewhat above the transverse wall 24. Nozzle means 25 is arranged so that it is directed towards the inside of the parts of the walls 23 extending beyond wall 24 during that part of the revolution of the rotatable drum 4 where the filter cake is to be removed (that is, in the removal zone). Thus, gas or liquid can be fed through the nozzle means 25 so that the fiber mass is detached at the outer edge and pulls off the rest of the filter cake.

A corresponding pipe means 26 (FIG. 13) can be provided to be connectable, with connecting pipes 27 and 28 which open on the filter surface in the walls 29 of the filter element. Gas or liquid can be fed to the connecting pipes in a similar way to cooperate in removing the fiber cake.

In another embodiment (FIG. 14) a pipe means 30 in two parts is connectable with connecting pipes 31 and 32 opening on the filter surface, in this case in outwardly bent walls 33 which are kept together by a circumferential transverse wall 34. The advantage with outwardly bent walls is that the filter cake can be removed even more easily.

In the embodiment of FIG. 5 a device as shown in FIGS. 12, 13 or 14 is built into a special element 36 which communicates with the interior of the filter element.

The operation of the rotatable filter assembly is obvious from the description above. Fiber suspension is fed through an inlet 35 (FIG. 3) and fiber mass accumulates on the outer surfaces of the filter elements 5 when these are submerged below a level 11 in the container 1. Filtrate is discharged continuously through the outlet pipe 13 (FIG. 1). In the upper position (that is, in the removal zone) the vacuum ceases and the filter cake is freed, with or without the aid of a device as shown in FIGS. 12, 13 or 14, and the dewatered fiber mass falls down into the collecting hopper 8 and is discharged.

As indicated above, rotary disc filters according to the invention can be operated at higher vacuum and higher speeds of rotation than prior devices. This results in markedly increased capacity for devices of the same filter area. It should be noted that these advantages were quite unexpected and indeed when the idea of locating the discharge tubes in groups was first suggested, it was considered that the increase in tube length and complexity of flow path would lead to the transport of an undesirably large quantity of filtrate, in the filter elements, into the removal zone, so that when the interior of the filter elements were subjected to atmospheric pressure, "back washing" would occur, i.e. the residual filtrate would be driven from the interior of the filter units back into the filter cake. These fears have not been realized and in fact filter units of the type described have been used in place of conventional drum filters having cylindrical filter surfaces at very substantial savings.

What I claim is:

1. In a rotatable filter assembly for separation of fibers from a fiber suspension and including in combination, a plurality of annular filter discs each comprising a plurality of filter elements, a horizontal drum, means for rotating said drum about an axis, said filter discs being mounted on said drum in substantially parallel, axially spaced relation to each other, a container for said fiber suspension in which said drum is rotatable, each filter element being a hollow chamber having walls of filter cloth and radially inner and outer ends, means for each of said chambers defining a filtrate outlet at the radially inner end of each of said chambers, said drum being generally cylindrical and including a series of discharge tubes extending in an axial direction, said tubes forming a grating-like mantle wall of the drum, each hollow chamber communicating through its filtrate outlet with a discharge tube, and a collecting hopper extending into the drum through an open end thereof and surrounded by said filter discs, said hopper having an upwardly facing entrance opening extending along all of said filter discs, the interior of each filter element being subjected to a lower pressure than that outside said element during part of the drum's revolution, the improvement in which said discharge tubes, as seen in a cross-sectional view transverse to said axis, are arranged in a plurality of groups each including at least two tubes, the spacing between adjacent tubes in each group being substantially less than the spacing between adjacent groups.

2. The assembly of claim 1 in which each tube in each group is contiguous with another tube in that group.

3. The assembly of claim 1, in which the tubes in each said group are located substantially on the same radius of the drum but at different radial distances from said axis of the drum.

4. The assembly of claim 3, in which the tubes of each group which are closer to said drum axis are circumferentially displaced in the rotation direction of the drum from the tubes of the group which are at a greater distance from said axis.

5. The assembly of claim 1, in which said discharge tubes have circular cross-sections.

6. The assembly of claim 1, in which the tubes of each group are located at substantially the same distance from said axis of the drum.

7. The assembly of claim 1, in which one filter element communicates with a discharge tube which is located, with reference to the rotation direction of the drum, after said one filter element, and another filter element located after said one filter element, communicates with a discharge tube arranged adjacent said one discharge tube.

8. The assembly of claim 1, in which the tubes of each group, as seen in cross-sectional view, have at least one dividing wall in common.

9. The assembly of claim 1, comprising guide plates which, with reference to the rotation of direction of the drum, are located in front of the discharge tubes of each group.

10. The assembly of claim 9, in which the guide plates extend radially beyond the axial tubes.

11. The assembly of claim 10, in which the guide plates extend radially and cover at least part of the radial extension of the filter elements.

12. The assembly of claim 11, in which each filter element has a transverse wall holding opposing walls of the element together, said opposing walls extending radially beyond said transverse wall.

13. The assembly of claim 1, in which the filter elements, as seen in a longitudinal sectional view, are bent outwardly along at least part of their outer ends.

14. The assembly of claim 1, in which each filter element at its outer end has a connecting pipe opening onto the filter surface and adapted to receive a fluid under pressure.

15. The assembly of claim 14, comprising a stationary nozzle for feeding said fluid into a connecting pipe during part of the revolution of said drum.

* * * * *